United States Patent [19]

Hiraiwa

[11] Patent Number: 4,653,347
[45] Date of Patent: Mar. 31, 1987

[54] PLANETARY GEAR TRAIN OF AUTOMATIC TRANSMISSION

[75] Inventor: Kazuyoshi Hiraiwa, Atsugi, Japan

[73] Assignee: Nissan Motor Co., Ltd., Yokohama, Japan

[21] Appl. No.: 831,281

[22] Filed: Feb. 20, 1986

[30] Foreign Application Priority Data

Feb. 21, 1985 [JP] Japan .................. 60-31555

[51] Int. Cl.$^4$ .................. F16H 57/10; F16H 37/08
[52] U.S. Cl. ........................ 74/759; 74/758; 74/695
[58] Field of Search ............ 74/758, 759, 695, 694, 74/701, 753

[56] References Cited

U.S. PATENT DOCUMENTS

| 3,386,314 | 6/1968 | Stockton | 74/759 |
| 4,056,986 | 11/1977 | Hobbs | 74/695 X |
| 4,368,649 | 1/1983 | Vahratian et al. | 74/758 X |
| 4,446,757 | 5/1984 | La Feyer | 74/758 |
| 4,452,099 | 6/1984 | Croswhite | 74/759 X |
| 4,454,786 | 6/1984 | Stockton | 74/759 X |
| 4,509,389 | 4/1985 | Vahratian et al. | 74/695 |
| 4,537,092 | 8/1985 | Morisawa | 74/695 |
| 4,602,525 | 7/1986 | Moroto et al. | 74/695 X |

Primary Examiner—Leslie Braun
Assistant Examiner—Joseph M. Rolnicki
Attorney, Agent, or Firm—Schwartz, Jeffery, Schwaab, Mack, Blumenthal & Evans

[57] ABSTRACT

In a planetary gear train of automatic transmission, there are disposed two one-way devices which are parallelly but reversedly arranged between the input shaft and a sun gear. Due to the flow-cut function of one of the one-way devices, the high speed rotation of the sun gear caused under a certain speed condition of the transmission is not transmitted to a clutch drum of the associated clutch device thereby to prevent the clutch device from malfunctioning.

7 Claims, 8 Drawing Figures

FIG.2

| SPEED \ PARTS | | C1 | C2 | C3 | B1 | B2 | B3 | OWC1 | OWC2 | GEAR RATIOS | $\alpha_1 = 0.43$ $\alpha_2 = 0.55$ |
|---|---|---|---|---|---|---|---|---|---|---|---|
| D RANGE | 1ST SPEED | ○ | | | | | ○ | ○ | | $(1+\alpha_2)/\alpha_2$ | 2.818 |
| | 2ND SPEED | (○) | ○ | ○ | | | ○ | | | $1+\alpha_1/\alpha_2(1+\alpha_1)$ | 1.547 |
| | 3RD SPEED | ○ | ○ | ○ | | | | ○ | ○ | 1 | 1.000 |
| | 4TH SPEED | | (○) | ○ | ○ | | | | | $1/(1+\alpha_1)$ | 0.699 |
| R RANGE | | | | | | ○ | | | | | |
| | | ○ | ○ | | | | ○ | ○ | ○ | $-1/\alpha_1$ | −2.326 |
| L RANGE | 1ST SPEED | ○ | ○ | | | | ○ | ○ | ○ | | |
| | 2ND SPEED | | | ○ | | | ○ | | | | |

PLANETARY GEAR TRAIN OF AUTOMATIC TRANSMISSION

BACKGROUND OF THE INVENTION

1. Field of the Invention

The present invention relates in general to an automatic transmission of a motor vehicle, and more particularly to an improvement in a planetary gear train of the transmission.

2. Description of the Prior Art

Hitherto, there has been proposed a four-speed (viz., three forward speeds and one overdrive) automatic transmission the planetary gear train of which comprises two planetary gear units, a plurality of clutch units and a plurality of brake units. However, in the conventional planetary gear trains hitherto proposed, some part is forced to rotate considerably faster than the input shaft of the transmission under a certain speed condition.

As is known, the presence of such high speed part in the transmission is undesirable because of necessity of using a highly durable and thus expensive materials for the part and its surrounding parts. In addition to this, the presence of the high speed part tends to induce the following problem in the transmissions of a type wherein the high speed part is incorporated with a clutch unit to rotate with the clutch drum of the same.

That is, even when the clutch is under its inoperative condition (viz., the clutch is not applied with a hydraulic pressure), high speed rotation of the clutch drum caused by rotation of the high speed part tends to induce an engaged condition of the associated clutch unit due to the inevitable centrifugal force applied to the oil in the clutch drum. As is known, this phenomenon causes malfunction of the transmission, and in a severe case, induces seizure of the clutch plates of the unit.

SUMMARY OF THE INVENTION

It is therefore an essential object of the present invention to provide an improved automatic transmission which is free of the problems encountered in the above-mentioned conventional automatic transmission.

According to the present invention, there is provided an improved planetary gear train of automatic transmission, which is equipped with one-way means to suppress the transmission of high speed rotation of a given part to a clutch drum under a certain speed condition.

According to the present invention, there is provided a planetary gear train of an automatic transmission having input and output shafts, the gear train comprising a first planetary gear unit including a first sun gear, a first internal gear and a first pinion carrier, a second planetary gear unit including a second sun gear, a second internal gear and a second pinion carrier, the first internal gear and the second pinion carrier being constantly connected to the output shaft, a first brake unit capable of braking the first and second sun gears which are connected to each other to rotate together, a clutch through which the first pinion carrier is connectable to the input shaft, a second brake unit capable of braking the first pinion carrier, a third brake unit capable of braking the second internal gear, and first and second groups of one-way means which are parallelly interposed between the input shaft and the first sun gear and arranged in a mutually reversed relationship so that the power transmission from the input shaft to the first sun gear and that from the first sun gear to the input shaft are respectively effected by the first and second groups of one-way means.

BRIEF DESCRIPTION OF THE DRAWINGS

Other objects and advantages of the present invention will become apparent from the following description when taken in conjunction with the accompanying drawings, in which:

FIG. 2 is a table showing ON/OFF condition of each part of the planetary gear train of FIG. 1 under various speed conditions of the transmission;

DETAILED DESCRIPTION OF THE INVENTION

Figure 1:
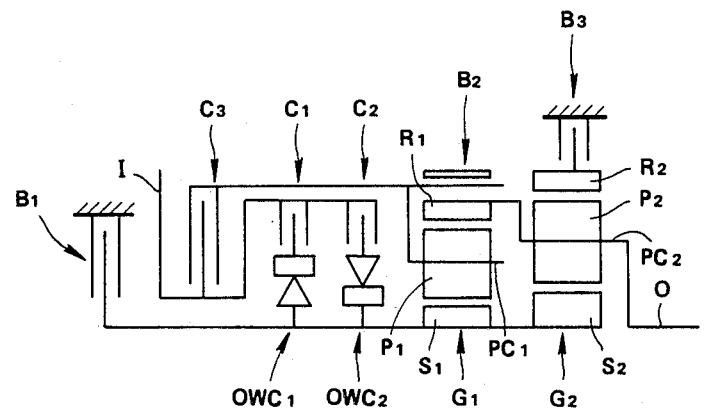
FIG. 1 is a schematic illustration of a planetary gear train of an automatic transmission according to the present invention.

Referring to FIG. 1, there is shown, but schematically, an improved planetary gear train of an automatic transmission according to the present invention.

The planetary gear train comprises a first planetary gear unit $G_1$, a second planetary gear unit $G_2$, an input shaft I, an output shaft O, first, second and third clutch units, $C_1$, $C_2$ and $C_3$, first, second and third brake units $B_1$, $B_2$ and $B_3$, and first and second one-way clutch units $OWC_1$ and $OWC_2$.

The first planetary gear unit $G_1$ includes a first sun gear $S_1$, a first internal gear $R_1$, first pinion gears $P_1$ and a first pinion carrier $PC_1$. Each first pinion gear $P_1$ engages with both the first sun gear $S_1$ and the first internal gear $R_1$, and the first pinion carrier $PC_1$ carries thereon the first pinion gears $P_1$. Similar to this, the second planetary gear unit $G_2$ comprises a second sun gear $S_2$, a second internal gear $R_2$, second pinion gears $P_2$ and a second pinion carrier $PC_2$. Each second pinion gear $P_2$ engages with both the second sun gear $S_2$ and the second internal gear $R_2$, and the second pinion carrier $PC_2$ carries thereon the second pinion gears $P_2$.

The first and second sun gears $S_1$ and $S_2$ are connected to each other and connectable to a fixed part by means of the first brake unit $B_1$. The first and second sun gears $S_1$ and $S_2$ are connectable to the input shaft I through the first clutch unit $C_1$ and the first one-way clutch unit $OWC_1$ and which are arranged in series. The first and second sun gears $S_1$ and $S_2$ are further connectable to the input shaft I through the second clutch unit $C_2$ and the second one-way clutch $OWC_2$ which are arranged in series. As shown, the first and second one-way clutch units $OWC_1$ and $OWC_2$ are arranged in parallel but in mutually reversed relationship. That is, the first one-way clutch unit $OWC_1$ is arranged to permit only the transmission of rotation of the input shaft I in a direction to drive the first sun gear $S_1$ (and thus also the second sun gear $S_2$), while the second one-way clutch unit $OWC_2$ is arranged to permit only the transmission of rotation of the first sun gear $S_1$ (and thus also the second sun gear $S_2$) in a direction to drive the input shaft I.

The first internal gear $R_1$ and the second pinion carrier $PC_2$ are constantly connected to the output shaft O. The first pinion carrier $PC_1$ is connectable to the input shaft I through the third clutch unit $C_3$, and connectable to a fixed part by means of the second brake unit $B_2$. The second internal gear $R_2$ is connectable to a fixed part by means of the third brake unit $B_3$.

FIG. 2 is a table showing ON/OFF (viz., engaged or disengaged) condition of the afore-mentioned parts or units under various speed conditions of the transmission. As is seen from this table, in the transmission to which the afore-mentioned planetary gear train is practically applied, four forward speeds and one reverse are available with the gear ratios shown in the table. It is to be noted that in the table, the parts marked with circles are in their ON (or engaged) conditions and the parts (viz., the first clutch unit $C_1$ and the second clutch unit $C_2$) marked with parenthesized circles are in a condition wherein ON (or engaged) conditions of them have no direct effects upon the power transmission then established. As shown, the forward third speed condition has two modes. The mode represented by the upper line is a mode wherein engine brake is established, while the other mode represented by the lower line is a mode wherein engine brake is not established. Furthermore, $\alpha_1$ and $\alpha_2$ carried on the table represent respectively the ratio of the number of teeth of the first sun gear $S_1$ to that of the first internal gear $R_1$, and the ratio of the number of teeth of the second sun gear $S_2$ to that of the second internal gear $R_2$.

As will be understood from the following description, when the transmission is in the second speed condition, the first and second sun gears $S_1$ and $S_2$ are forced to rotate considerably faster than the input shaft I. The reason of this will be described in the following with reference to the chart of FIG. 4 which shows the relative rotation speeds of the parts under the second speed condition of the transmission.

Figure 4:
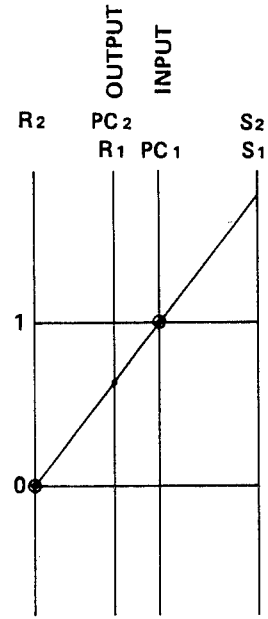
FIG. 4 is a chart similar to FIG. 3, but showing the relative rotation speed of each part under the second speed condition of the transmission.
Figure 5:
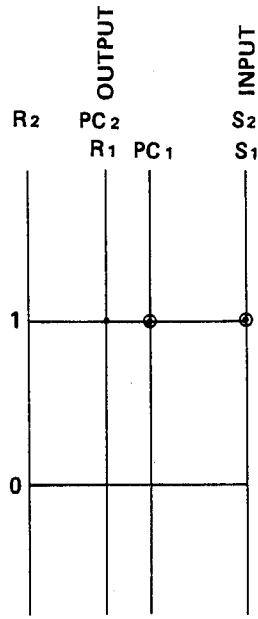
FIG. 5 is a chart similar to FIG. 3, but showing the relative rotation speed of each part under the third speed condition of the transmission.
Figure 6:
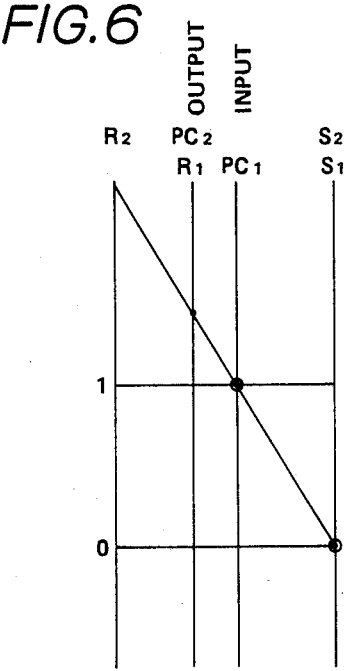
FIG. 6 is a chart similar to FIG. 3, but showing the relative rotation speed of each part under the fourth speed (viz., overdrive) condition of the transmission.
Figure 7:
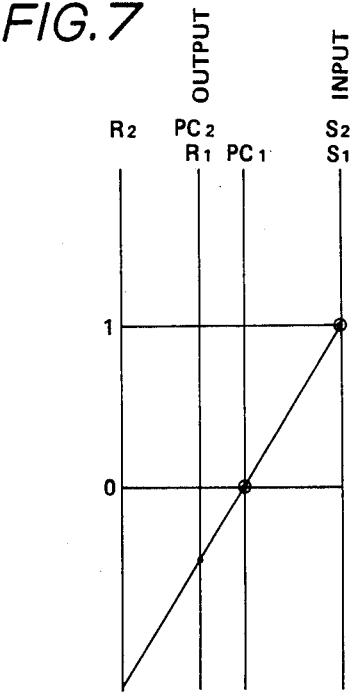
FIG. 7 is a chart similar to FIG. 3, but showing the relative rotation speed of each part under the reverse condition of the transmission.

The chart of FIG. 4 and the other charts (FIGS. 3, 5, 6 and 7) have been prepared by embodying the following concept.

That is, assuming that the rotation speeds of the internal gear R, the pinion carrier PC and the sun gear S are represented by $N_R$, $N_{PC}$ and $N_S$, and the ratio of the number of teeth of the sun gear S to that of the internal gear R is represented by $\alpha_1$, the following equation is established.

$$N_R + \alpha \times N_S - (1+\alpha) \times N_{PC} = O \quad (1)$$

Accordingly, assuming that there are provided three ordinate axes (viz., R-axis, PC-axis and S-axis) which respectively represent the relative rotation speeds of the internal gear R, the pinion carrier PC and the sun gear S, and that these axes are arranged so that the ratio of the distance between the R-axis and the PC-axis to that between the PC-axis and the S-axis is $\alpha$, any straight line intersecting these three axes can provide three points which satisfy the above equation (1).

In case wherein two planetary gear units are used, the axes for the mutually connected elements are described in the same position.

Referring back to FIG. 4, there is shown the chart which represents the relative rotation speeds of the parts when the transmission assumes the second speed condition. In this condition, the second internal gear $R_2$ is connected to a fixed part by the third brake unit $B_3$. Thus, there is provided relative rotation speed point '0' on the $R_2$-axis. Due to establishment of connection between the first pinion carrier $PC_1$ and the input shaft I by the third clutch unit $C_3$, there is provided relative rotation speed point '1' on the $PC_1$-axis. Thus, the straight line connecting these two points can indicate the relative rotation speeds of the associated parts by the points intersecting with the axes. In this second speed condition, the $PC_2$-axis and $R_1$ axis represent the relative rotation speed of the output shaft O. Thus, it will be appreciated that in this condition, the rotation speed of the output shaft O is lower than that of the input shaft I.

However, as is seen from this chart, the first and second sun gears $S_1$ and $S_2$ are forced to rotate at a speed approximately 1.8 times that of the input shaft I. This means that the inner race of the first one-way clutch unit $OWC_1$, which is connected to the sun gears $S_1$ and $S_2$ to rotate therewith, is forced to rotate at high speeds. However, due to the flow-cut function of the first one-way clutch unit $OWC_1$, the high speed rotation of the inner race is not transmitted to the outer race of the first one-way clutch unit $OWC_1$. Thus, even when the clutch drum of the first clutch unit $C_1$ is in connection with the outer race (see the table of FIG. 2), the former is prevented from being rotated at high speed. (Strictly speaking, however, the clutch drum rotates but slowly due to a small friction effect between the inner and outer races of the first one-way clutch unit $OWC_1$.)

Accordingly, the centrifugal force applied to the oil in the clutch drum is zero or at least negligible. Thus, unlike the case of the afore-mentioned conventional automatic transmission, the undesired phenomenon does not occur. That is, the dangerous seizure of the clutch plates does not occur.

It is to be noted that the charts of FIGS. 3, 5, 6 and 7 show the relative rotation speeds of the parts under first speed, third speed, fourth speed and reverse conditions, respectively. As is seen from the chart of FIG. 6, in the condition of the fourth speed (viz., overdrive), the second internal gear $R_2$ is forced to rotate at high speed. However, even under this, there is no chance that the clutch drum becomes connected with the gear $R_2$. Thus, undesired phenomenon does not occur also in this fourth speed condition.

Figure 8:
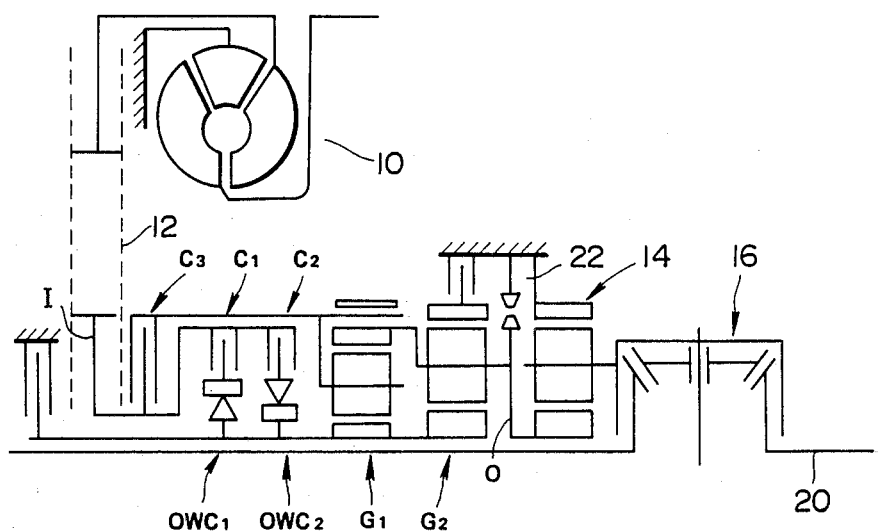
FIG. 8 is a schematic illustration of a transverse automatic transaxle to which the improved planetary gear train of the present invention is practically applied.
Figure 3:
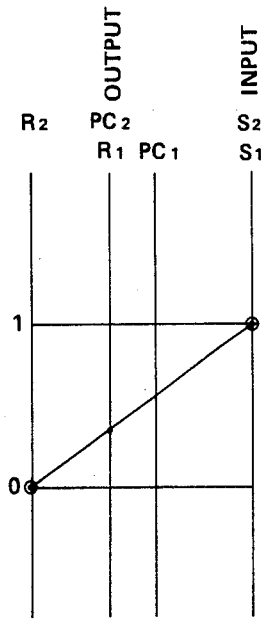
FIG. 3 is a chart showing the relative rotation speed of each part of the planetary gear train under the first speed condition of the transmission.

Referring to FIG. 8, there is shown but schematically a transverse automatic transaxle (that is, the transaxle designed for a F—F type motor vehicle) to which the afore-mentioned improved planetary gear train is practically applied. As shown, the output of a torque converter 10 is applied to the input shaft I through a chain 12, and the rotation of the output shaft O is transmitted to a differential gear 16 through a final speed reduction gear 14 of planetary gear type. The output of the differential gear 16 is applied to both the left and right drive shafts 18 and 20. Denoted by numeral 22 is a parking device which is incorporated with the output shaft O, which, upon requirement of parking, locks the output shaft O.

As will be understood from the foregoing description, in the automatic transmission according to the present invention, the undesired high speed rotation of the clutch drum is prevented by the provision of the one-way clutch unit. That is, even when a part (viz., first and second sun gears $S_1$ and $S_2$) is forced to rotate at high speed under the second speed condition of the transmission, the high speed rotation is not transmitted to the clutch drum because of the provision of the one-way clutch unit therebetween.

What is claimed is:

1. A planetary gear train for an automatic transmission having input and output shafts, comprising:
   a first planetary gear unit including a first sun gear, a first internal gear and a first pinion carrier;
   a second planetary gear unit including a second sun gear, a second internal gear and a second pinion carrier, said first internal gear and said second pinion carrier being constantly connected to said output shaft;
   a first brake unit capable of braking said first and second sun gears which are connected to each other to rotate together;
   a clutch through which said first pinion carrier is connectable to said input shaft;
   a second brake unit capable of braking said first pinion carrier;
   a third brake unit capable of braking said second internal gear; and
   first and second groups of one-way means which are parallelly interposed between said input shaft and said first sun gear and arranged in a mutually reversed relationship so that the power transmission from said input shaft to said first sun gear and that from said first sun gear to said input shaft are respectively carried out by said first and second groups of one-way means.

2. A planetary gear train as claimed in claim 1, in which each of said first and second groups of one-way means comprises:
   a clutch unit incorporated with said input shaft; and
   a one-way clutch unit incorporated with said first sun gear,
   wherein said clutch unit and said one-way clutch unit are arranged in series.

3. A planetary gear train as claimed in claim 2, in which the two one-way clutch units of said first and second groups are arranged in a mutually reversed relationship.

4. A planetary gear train as claimed in claim 3, in which the clutch unit of each of said first and second groups comprises a clutch drum which is connected to said input shaft.

5. A planetary gear train as claimed in claim 4, in which the one-way clutch unit of each of said first and second groups comprises an inner race constantly connected to said first sun gear and an outer race constantly connected to the associated clutch unit.

6. A transverse automatic transaxle comprising:
   an input shaft;
   an output shaft; and
   a planetary gear train which comprises:
   a first planetary gear unit including a first sun gear, a first internal gear and a first pinion carrier;
   a second planetary gear unit including a second sun gear, a second internal gear and a second pinion carrier, said first internal gear and said second carrier being constantly connected to said output shaft;
   a first brake unit capable of braking said first and second sun gears which are connected to each other to rotate together;
   a clutch through which said first pinion carrier is connectable to said input shaft;
   a second brake unit capable of braking said first pinion carrier;
   a third brake unit capable of braking said second internal gear; and
   first and second groups of one-way means which are parallelly interposed between said input shaft and said first sun gear and arranged in a mutually reversed relationship so that the power transmission from said input shaft to said first sun gear and that from the first sun gear to said input shaft are respectively carried out by said first and second groups of one-way means.

7. A transverse automatic transaxle as claimed in claim 6, in which said input shaft is connected to a torque converter through a chain, further in which said output shaft is connected to a differential gear through a final speed reduction gear.

* * * * *